(12) United States Patent
Vedsted et al.

(10) Patent No.: US 8,616,940 B2
(45) Date of Patent: Dec. 31, 2013

(54) APPARATUS AND METHOD FOR CLEANING PEELING MACHINES

(75) Inventors: Lars Vedsted, Vadum (DK); Søren Vedsted, Vadum (DK); Brent A. Ledet, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 829 days.

(21) Appl. No.: 12/207,575

(22) Filed: Sep. 10, 2008

(65) Prior Publication Data

US 2010/0062697 A1    Mar. 11, 2010

(51) Int. Cl.
*A22C 29/02*    (2006.01)

(52) U.S. Cl.
USPC .................................... 452/5; 452/9

(58) Field of Classification Search
USPC .................. 452/1, 2, 5, 7, 9, 12, 19
See application file for complete search history.

(56) References Cited

U.S. PATENT DOCUMENTS

| | | | |
|---|---|---|---|
| 2,537,355 A | 1/1951 | Lapeyre et al. | |
| 2,574,044 A | 11/1951 | Lapeyre et al. | |
| 2,778,055 A | 1/1957 | Lapeyre et al. | |
| 2,781,544 A | 2/1957 | Skrmetta | |
| 3,383,734 A * | 5/1968 | Lapeyre | 452/5 |
| 3,740,795 A * | 6/1973 | Cox | 452/5 |
| 3,975,797 A | 8/1976 | Grimes et al. | |
| 4,507,044 A * | 3/1985 | Hutchins et al. | 414/744.3 |
| 4,738,174 A | 4/1988 | Bloomquist | |
| 5,120,265 A * | 6/1992 | Ledet et al. | 452/5 |
| 5,167,720 A | 12/1992 | Diamond et al. | |
| 5,611,248 A | 3/1997 | Peltier | |
| 5,980,373 A | 11/1999 | Rosow et al. | |
| 6,017,268 A * | 1/2000 | Rosow et al. | 452/5 |
| 6,077,152 A | 6/2000 | Warehime | |
| 6,248,010 B1 | 6/2001 | Sirgo et al. | |
| 6,435,959 B1 | 8/2002 | Skrmetta | |
| 6,626,630 B1 | 9/2003 | Lomerson, Jr. et al. | |
| 6,627,466 B1 * | 9/2003 | Berman et al. | 438/14 |
| 7,189,049 B1 * | 3/2007 | Blomgren et al. | 414/751.1 |
| 2005/0025895 A1 | 2/2005 | Takeuchi | |
| 2008/0229860 A1 * | 9/2008 | Bonev | 74/479.01 |

FOREIGN PATENT DOCUMENTS

| | | |
|---|---|---|
| CN | 1631625 A | 6/2005 |
| CN | 100560312 C | 11/2009 |
| GB | 2235393 A | 3/1991 |

OTHER PUBLICATIONS

Laitram Machinery, Inc., "Automatic Insert Cleaning System" data sheet, Apr. 2001, Laitram Machinery, Inc., Harahan, Louisiana, U.S.A.
Lexis/Nexis English translation of CN 1631625A.
Search Report of cognate Chinese Patent Application No. 200980135491.8.

* cited by examiner

*Primary Examiner* — David Parsley
(74) *Attorney, Agent, or Firm* — James T. Cronvich

(57) ABSTRACT

Methods and apparatus for cleaning the peeling section of a roller-type peeling machine. The apparatus includes an x-y robot disposed above the peeling section of the peeling machine. The robot has a cleaning tool, such as a liquid spray nozzle, as an end effector. A controller commands the robot to control the movement of the cleaning tool along a predetermined cleaning path to clean the peeling section. One such cleaning path follows each of the insert rollers in the peeling section of a peeling machine.

11 Claims, 8 Drawing Sheets

APPARATUS AND METHOD FOR CLEANING PEELING MACHINES

BACKGROUND

The invention relates generally to roller-type peeling machines and, more particularly, to robotic tools for cleaning the peeling channels of roller-type peeling machines.

Roller-type peeling machines are used most often to peel shrimp. These machines typically have side-by-side peeling channels, each of which is formed by a bottom roller and a pair of flanking side rollers slightly elevated above the bottom roller. The bottom and side rollers reciprocate back and forth. Smaller-diameter, metal insert rollers occupy the spaces between the bottom and side rollers. The rollers are typically inclined downward from a higher entrance end where unpeeled shrimp are loaded into the peeling channel to a lower exit end from which peeled shrimp meats drop. The bottom and side rollers are rubber-coated to frictionally rotate the insert rollers. The back-and-forth rotation of the rollers shifts the shrimp alternately from one side of the peeling channel to the other. Consequently, the shrimp are presented in constantly changing orientations to nips formed between the bottom roller and the inserts for fresh grips by the peeling rollers. Most of the shells, swimmerettes, and shrimp juices squeeze between the bottom roller and the inserts, where they are collected below. But some of the juices and solid debris cling to the inserts and degrade the grip of the insert and bottom rollers on the shrimp. Therefore, it is necessary to clean the inserts often to peel effectively.

Some peeling machines are equipped with an array of spray nozzles directed at the insert rollers at discreet points along their lengths. The nozzles extend from a network of parallel pipes crossing the peeling channels at spaced intervals. The nozzles are positioned along each pipe just above each insert roller to clean it.

One shortcoming of these fixed spray-nozzle arrays is that they require many nozzles, each of which may clog at some time or another, to clean the inserts. Another shortcoming is that the fixed array does not allow the entire length of each insert to be subjected to the same spray pressure.

SUMMARY

These shortcomings and others are overcome by an apparatus for cleaning the peeling sections of roller-type cleaning machines that embodies features of the invention. The apparatus, which is designed for cleaning the peeling section of a roller-type peeling machine having peeling channels formed by a plurality of parallel, overlapping rollers, comprises an x-y robot and a controller coupled to the robot to control its operation. The robot, which is disposed above the cleaning section, has a cleaning tool that can be translated along x and y axes defining a working envelope encompassing the array. The controller is coupled to the robot to move the cleaning tool along a predetermined cleaning path within the working envelope to clean the peeling section.

In another aspect of the invention, a method for robotically cleaning an array of parallel inserts in a roller-type peeling machine comprises: (a) advancing a robotically positionable cleaning tool along the lengths of a first insert to clean it; (b) translating the cleaning tool to a second insert; (c) advancing the cleaning tool along the length of the second insert to clean it; and (d) repeating steps (b) and (c) on other inserts until all have been cleaned.

In yet another aspect, a peeling machine embodying features of the invention comprises a frame supporting a peeling section of the peeling machine. The peeling section is defined by side-by-side peeling channels formed by a reciprocating bottom roller and the pair of flanking side rollers rotated by contact with the bottom roller. Cylindrical insert rollers occupy spaces between the bottom and side rollers along the length of the peeling channels. An x-y robot mounted to the frame above the peeling section has a cleaning tool that can be translated along x and y axes. The axes define a working envelope that encompasses the peeling section of the machine. A controller is coupled to the robot to move the cleaning tool along a predetermined cleaning path within the working envelope to clean the peeling section.

BRIEF DESCRIPTION OF THE DRAWINGS

These aspects and features of the invention, as well as its advantages, are better understood by referring to the following description, appended claims, and accompanying drawings, in which:

DETAILED DESCRIPTION

Figure 1:
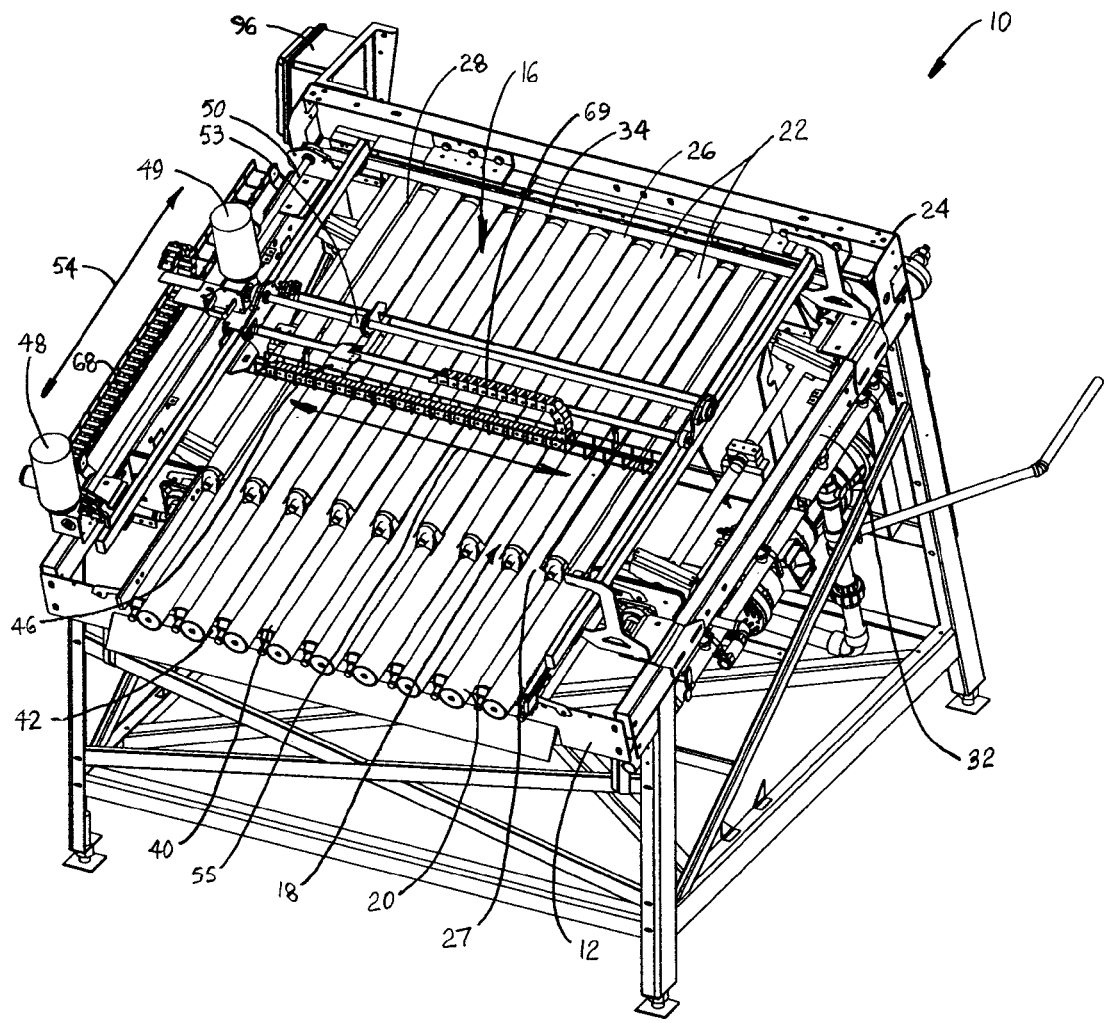
FIG. 1 is a perspective view of a peeling machine with an insert cleaner embodying features of the invention.
Figure 2:
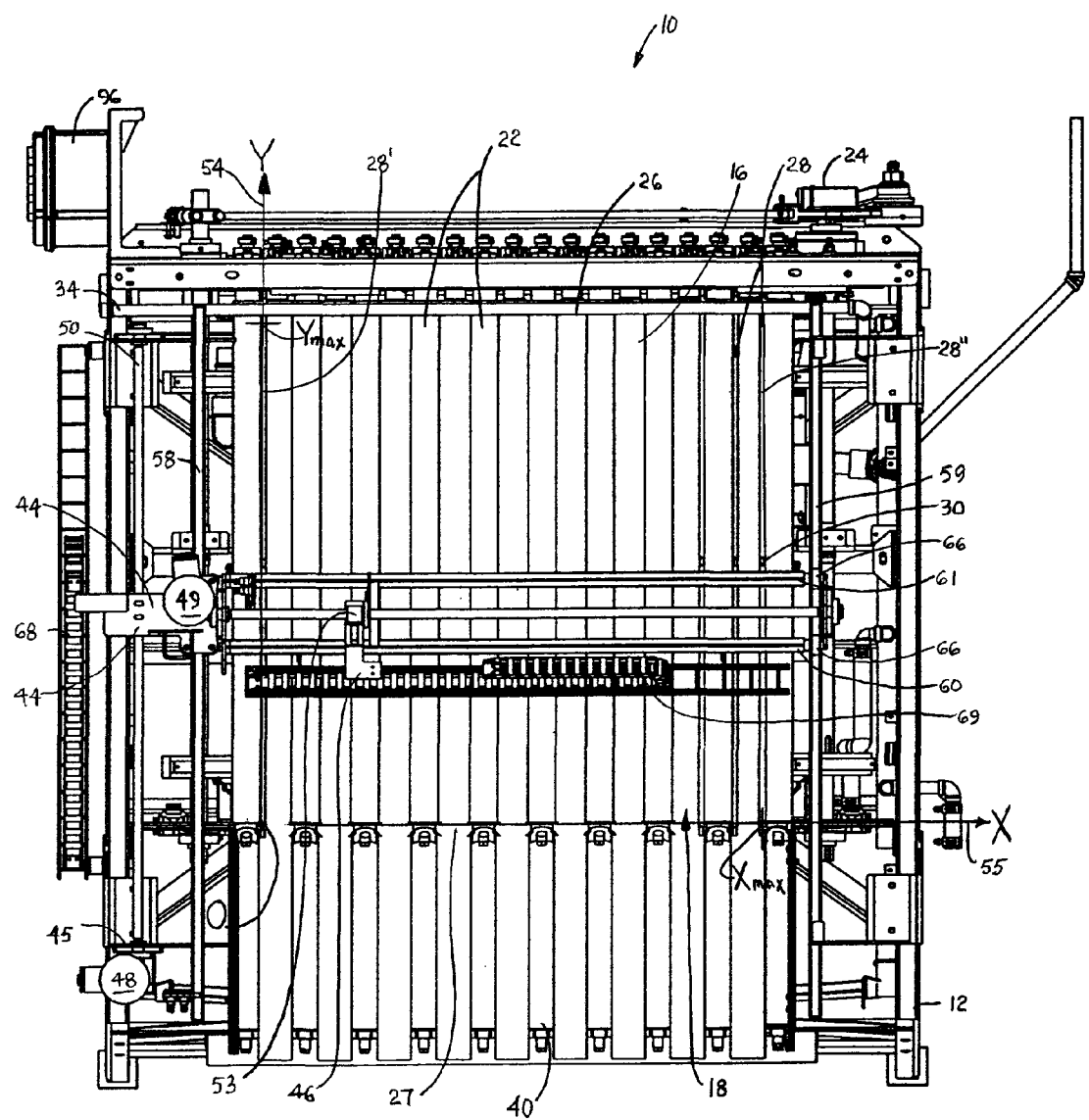
FIG. 2 is a top plan view of the peeling machine of FIG. 1.
Figure 3:
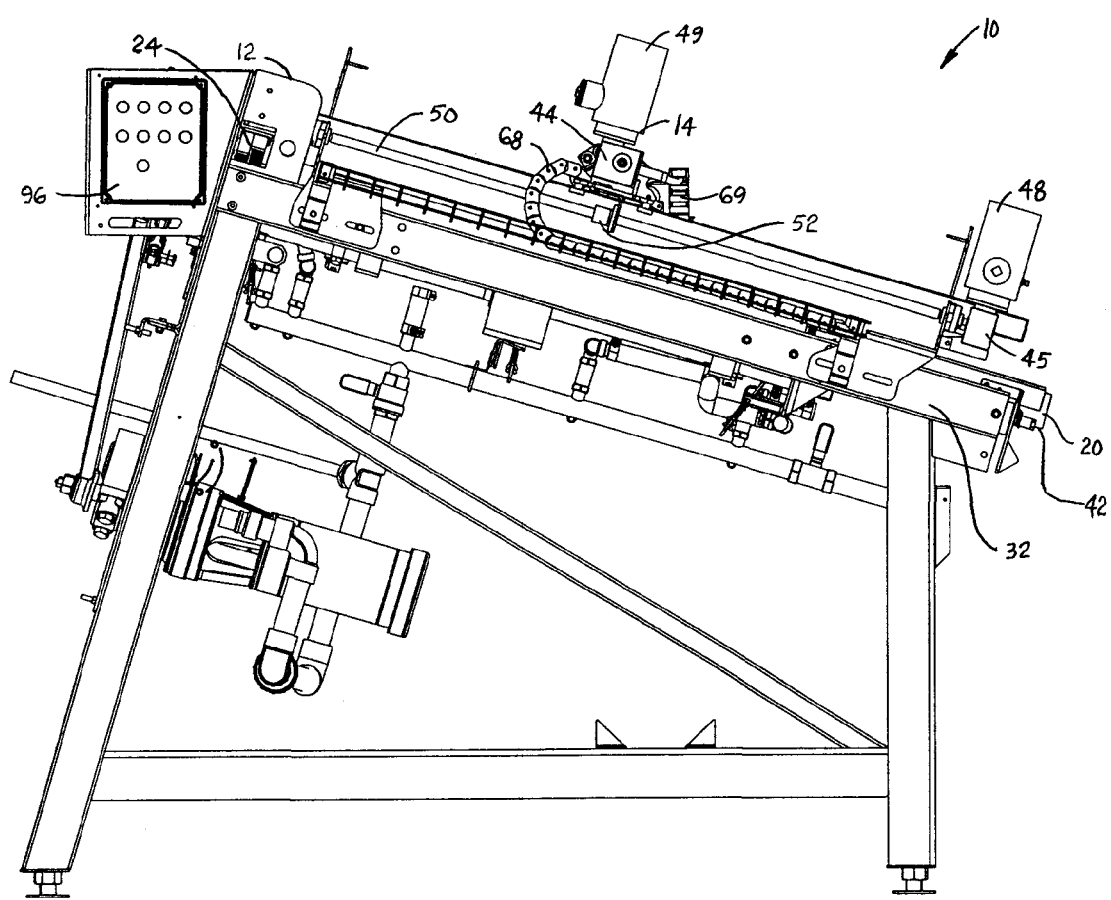
FIG. 3 is a side elevation view of the peeling machine of FIG. 1.

A peeling machine with an insert-roller cleaning system embodying features of the invention is shown in FIGS. 1-3. The peeling machine 10 includes a peeler 12 and a robotic insert cleaning system 14. The exemplary peeler shown in FIG. 1 is a cold-water shrimp peeler such as one of those manufactured and sold by Laitram Machinery, Inc. of Harahan, La., U.S.A. The peeler is a roller-type peeler with an upper peeling section 16 comprising a number of side-by-side peeling channels 18.

Each channel is formed by a bottom roller 20 and a pair of flanking side rollers 22 elevated slightly above the bottom roller. The bottom roller is rotated back and forth by a drive mechanism 24 at an elevated end 26 of the upper peeling section. The side rollers, which rest on the bottom rollers, are rotated by tangential contact with the rotating bottom rollers in the opposite direction. Shrimp or whatever products are to be peeled are loaded into the upper peeling section at the elevated entrance end 26. The bottom and side rollers are coated with rubber for frictional contact with each other and the shrimp. Smaller-diameter metal insert rollers 28 ("inserts," for short) occupy spaces between the bottom roller and the side rollers. (Inserts are not shown in the drawings in every space to better show the spaces.) The inserts are biased downward against the bottom and side rollers by spring-loaded hold down members 30 attached to the peeler's supporting frame 32. The back-and-forth rotation of the bottom and side rollers causes the inserts to rotate. Unpeeled shrimp loaded into the upper peeling section are urged down the peeling channels to a lower exit end 27 of the upper peeling section by water sprayed onto the peeler from outlets in a pipe 34 at the entrance end and the action of gravity in the declining upper peeling section.

The heads and shells of the shrimp are unwrapped from the meats in peeling nips formed between the inserts and the rubber rollers. The reciprocating action of the rollers alternately grabbing and releasing the shrimps shifts them from one side of the channel to the other and presents them in different orientations to the peeling nips for thorough peeling.

After exiting the upper peeling section, the largely peeled shrimp meats enter a lower peeling section 36 comprising lower channels 38 formed by the powered bottom rollers, which extend past the exit end of the upper peeling section into the lower peeling section, and idle base rollers 40, on which the powered bottom rollers are supported. Residual shrimp shell and gristle are removed in the gentler lower peeling channels without damage to the largely exposed meats. The peeled shrimp meats exit the peeler at an output end 42 of the lower peeling section for further processing.

To dislodge and wash away shrimp fluids, shells, and other debris from the inserts 28, the peeler is equipped with the robotic cleaning system 14. The cleaning system is realized by an x-y, or gantry, robot comprising x- and y-axis assemblies 44, 45 that together position an end effector, in this case, a cleaning tool 46, within a working envelope encompassing the upper peeling section 16 and the inserts. The y-axis assembly 45 is affixed to the peeler frame 32 and includes a motor 48 driving a lead screw 50 to translate a nut 52 along a y axis 54 parallel to the axes of the inserts 28 and the channel-forming rollers 20, 22. Attached to the nut 52 is a trolley 56 to which the x-axis assembly 44 is attached. The trolley rides along a rail 58 parallel to the y axis.

Figure 4:
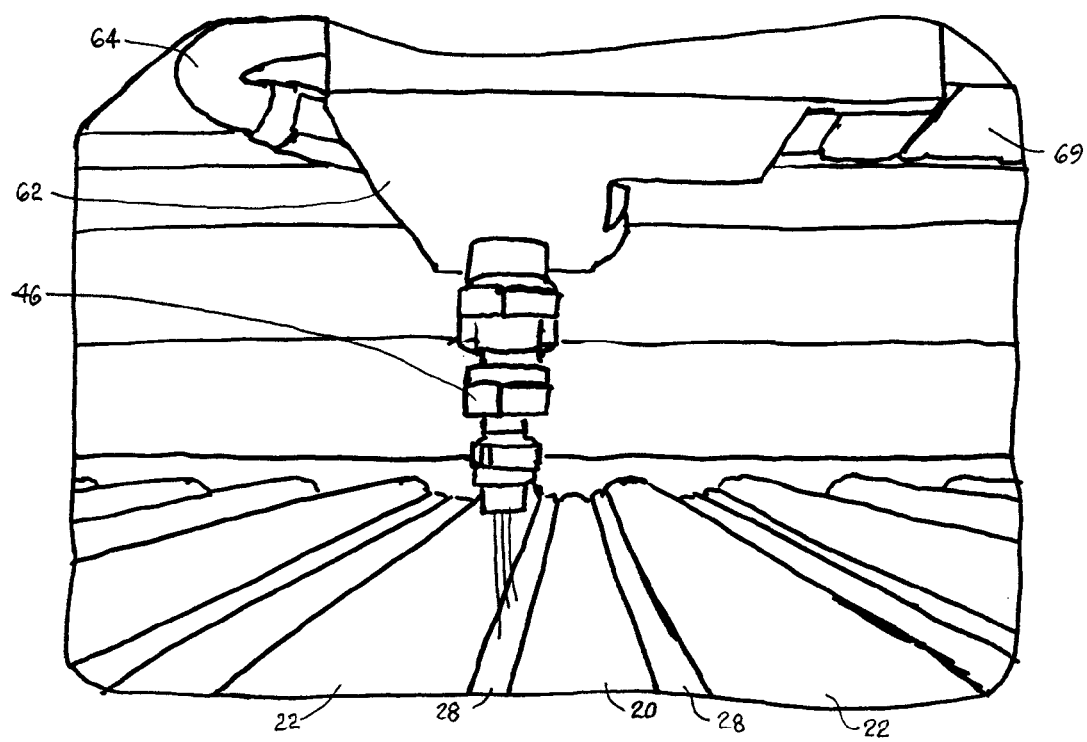
FIG. 4 is a front elevation view of one version of a cleaning tool usable in the peeling machine of FIG. 1.

Like the y-axis assembly, the x-axis assembly includes a motor 49 driving another lead screw 51 to translate a nut 53. The motor rides on the trolley from which the lead screw and x-axis support rails 60, 61 extend and define an orthogonal x axis 55 perpendicular to the insert's axes. A trolley 62 attached to the x-axis nut 53 rides along the lower rail 60 and supports the cleaning tool 46 just above the peeling channels in the upper peeling section, as also shown in FIG. 4. The cleaning tool 46 shown is a spray nozzle mounted to the trolley 62 and fed liquid by a hose 64. In a preferred cleaning arrangement, the liquid spray is aimed directly at the inserts 28 to clean them.

Wheels 66 on the ends of the x-axis rails 60, 61 opposite the motors ride along a y-axis side rail 59 as the cleaning tool is translated along the y axis. Flexible cable and hose trays 68, 69 confine electrical wires and fluid hoses from the peeler to the x- and y-axis assemblies of the x-y robot.

As shown in FIG. 2, the x-y robot defines an x-y Cartesian coordinate system whose origin O may be considered to arbitrarily lie at the lower end of the leftmost insert 28' for a system designed specifically to clean the roller inserts. As also shown in FIG. 2, the working envelope of the robot for this cleaning arrangement is confined generally to the upper peeling section 16 between the leftmost and rightmost inserts 28', 28". The robot positions the cleaning tool at any coordinates within the working envelope between $(x, y)=(0, 0)$ and $(X_{max}, Y_{max})$, where $Y_{max}$ represents the length of the inserts and $X_{max}$ represents the distance between the rightmost and leftmost inserts.

Figure 5A:
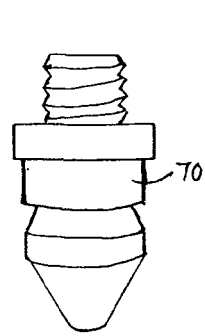
FIGS. 5A-5C are side elevation views of other versions of cleaning tools usable with a peeling machine as in FIG. 1.
Figure 5B:
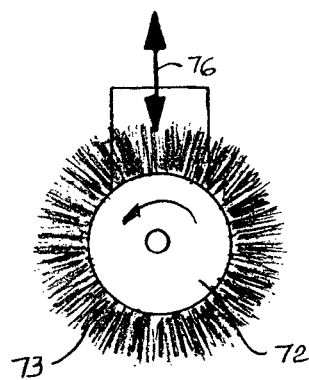
Figure 5C:
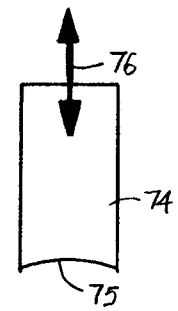

FIGS. 5A-5C show some alternative cleaning tools to the fluid spray nozzle 46 of FIG. 4. FIG. 5A shows an air-jet nozzle 70 that would screw into the trolley 62 and be connected by hoses to a source of compressed air. Unlike fluid and air nozzles, some cleaning tools, such as a brush 72 with bristles 73 as in FIG. 5B and a scraper 74 with a contoured blade 75 as in FIG. 5C, must physically contact the inserts. As a consequence, these contacting cleaning tools require a third degree of freedom in their movement to avoid hitting the elevated side rollers 22 as the tools move along the x axis to another insert. The robot or the contacting tools has a further z-axis control to raise and lower the cleaning tool as indicated by arrow 76. Any small, conventional linear actuator may be used to raise and lower the cleaning tool.

Figure 6:
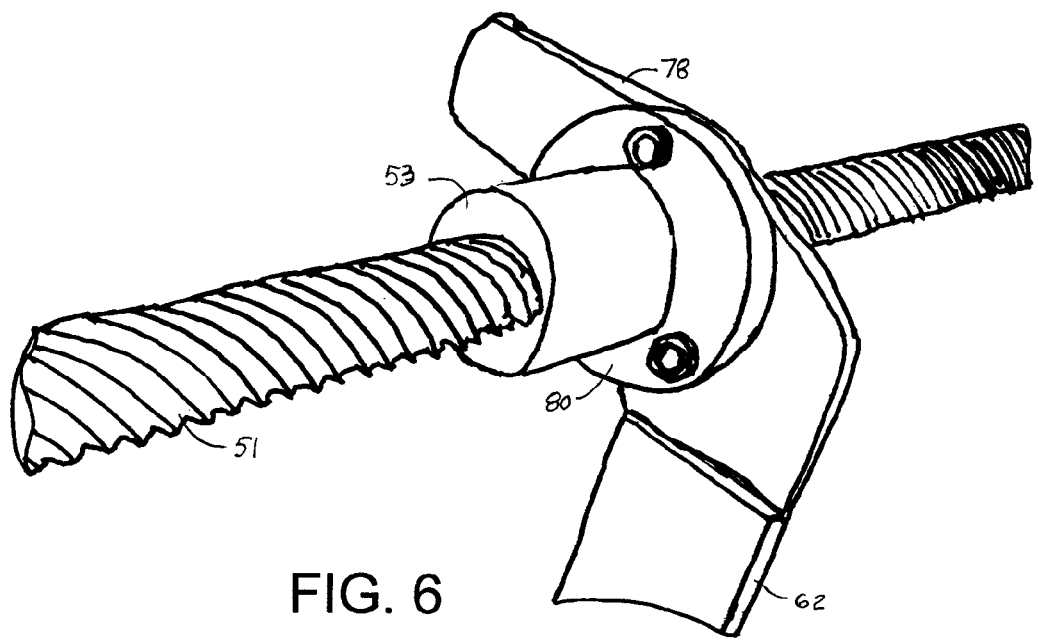
FIG. 6 is a perspective view of a lead screw and nut used as x- and y-axis assemblies in a robot driving the cleaning tool in the peeling machine of FIG. 1.

Details of the lead screw as used in both the x- and y-axis robot assemblies are shown in FIG. 6. In this case, the x-axis screw 51 is shown. Preferably, the lead screw is a stainless-steel, high-helix lead screw, such as one of those manufactured by Eichenberger Gewinde AG of Burg, Switzerland. The high helix angle allows the nut 53 to move rapidly along the screw as it is rotated by its motor. Preferably, the nut is a thermoplastic flange nut made out of POM-C. A support arm 78 of the cleaning tool trolley 62 is bolted to the flange 80 of the nut.

Figure 7A:
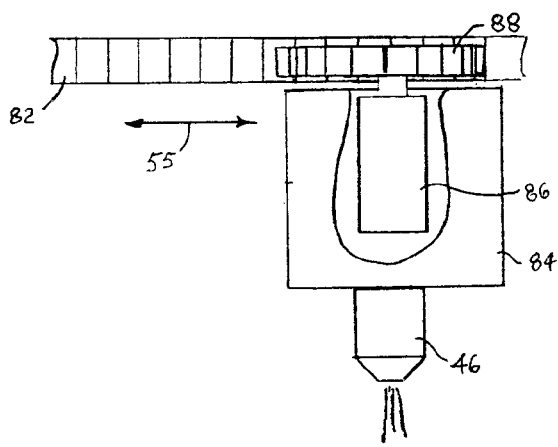
FIGS. 7A and 7B are side elevation views, partly cut away, of two alternative versions of x- and y-axis assemblies usable with a peeling machine as in FIG. 1.

One alternative for providing linear motion in the x-y robot is shown in FIG. 7A. In this example, the x axis is defined by a rack gear 82. The cleaning tool 46 is mounted to a carrier 84 that houses a motor 86 driving a pinion gear 88 along the rack to position the tool along the x axis 55.

Figure 7B:
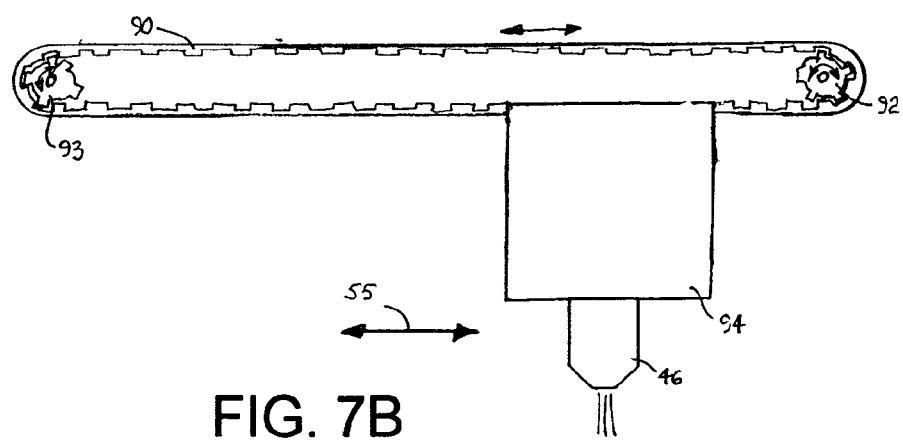

Another alternative to the lead screw is shown in FIG. 7B, in which an endless toothed belt 90 is trained around drive and idle gears 92, 93. The cleaning tool 46 is mounted to a trolley 94 and is firmly affixed to the belt. A drive motor (not shown) is coupled to the drive gear 92 to position the belt and the attached cleaning tool on the x axis 55.

Figure 8:
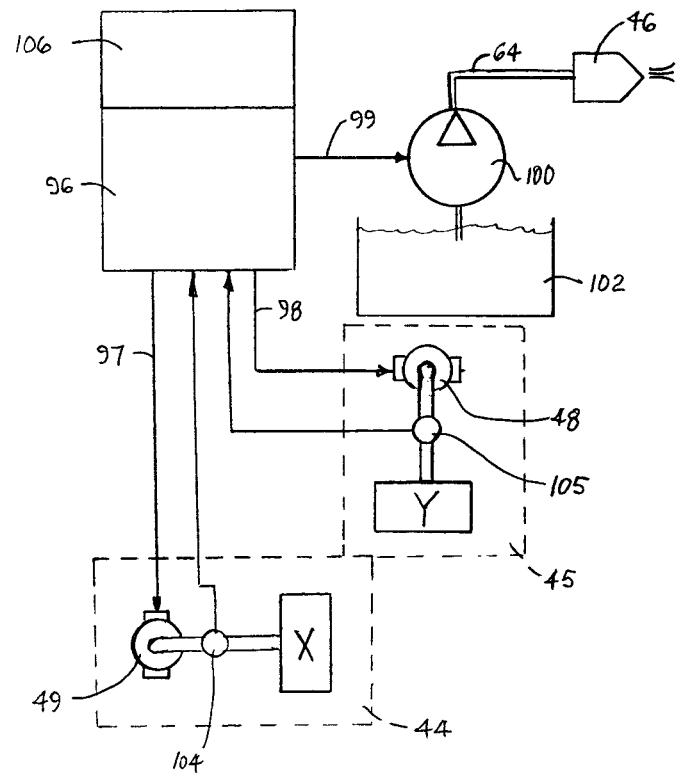
FIG. 8 is a block diagram of the control system for the insert cleaner in the peeling machine of FIG. 1.

Control of the robotic cleaning system is provided by a controller 96, such as a programmable logic controller or a general-purpose computer. The control function is schematically illustrated in simplified form in FIG. 8. Signals on the output control lines 97, 98, 99 control the position of the cleaning tool in the x-y coordinate system and the cleaning action of the cleaning tool. The signal on the control line 97 controls the x-axis motor 49 in the x-axis assembly 44 to position the cleaning tool along the x axis. The signal on the control line 98 controls the y-axis motor 48 in the y-axis assembly 45 to position the cleaning tool along the y axis. The signal on line 99 activates and deactivates the cleaning action of the cleaning tool. In the example shown for a liquid spray nozzle, the signal turns on and off a pump 100 that draws liquid from a reservoir 102 and delivers it to the spray nozzle via the hose 64. For an air jet, the signal would control a compressor or a pneumatic valve. For one of the contact cleaning tools, the signal on the line 99 would control the z-axis position of the tool to raise and lower it. Feedback is provided to the controller by x- and y-position sensors 104, 105 such as rotary encoders, that allow the controller to determine the instantaneous x and y coordinates of the cleaning tool. The controller has a user interface 106 that allows an operator to set various control parameters, such as the cleaning repetition rate, the cleaning speed, and the delay between consecutive cleaning cycles, and to calibrate the robot.

Figure 10:
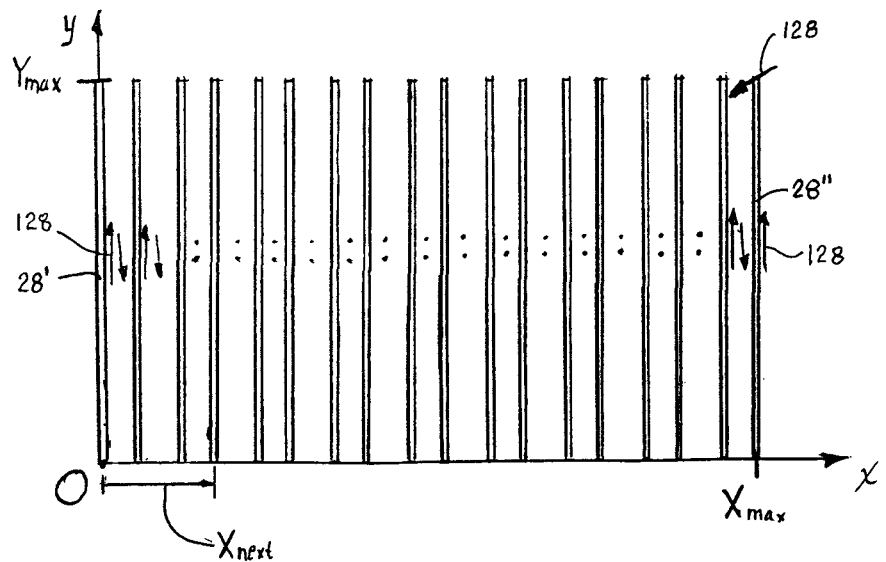
FIG. 10 is a diagram of the working envelope of the robot in the peeling machine of FIG. 1 in an x-y Cartesian coordinate system.
Figure 9:
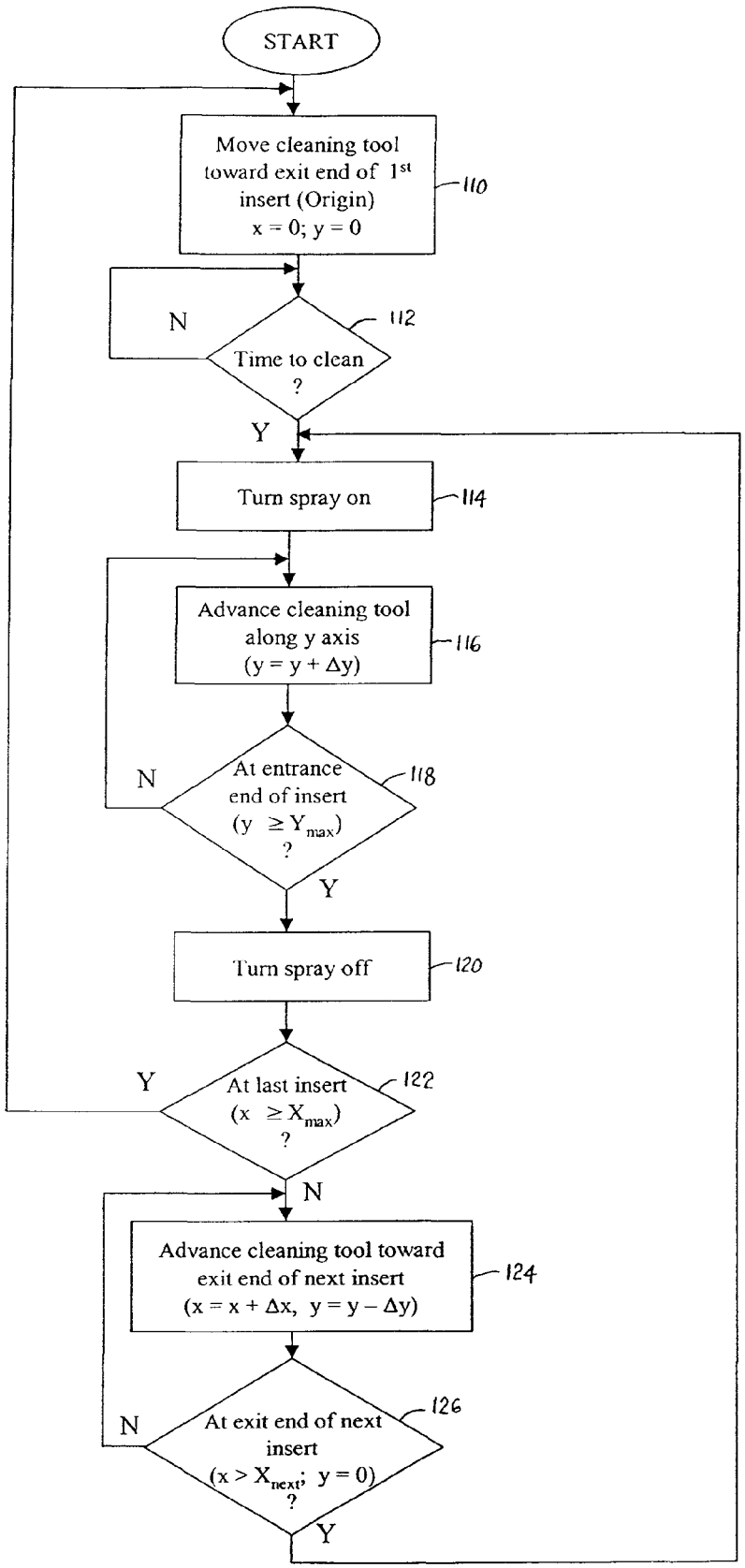
FIG. 9 is a flowchart of one version of logic used to program the controller of FIG. 8 to clean the insert rollers of the peeling machine of FIG. 1.
Figure 11A:
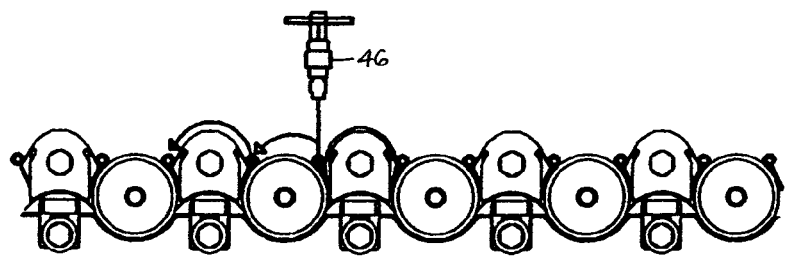
FIGS. 11A-11D are views of four different cleaning tool arrangements looking up the peeling channels of the upper peeling section of a peeler as in FIG. 1.

The flowchart of an example insert cleaning routine that can be downloaded or programmed into the controller is shown in FIG. 9. The routine illustrates just one exemplary method of robotically cleaning the inserts. In a first step 110, by signals on lines 97 and 98 of FIG. 8, the controller moves the cleaning tool to an initial position, such as the lower exit end of the leftmost insert 28', which, for convenience, may define the origin O, (x, y)=(0, 0), of the robot's x-y Cartesian coordinate system shown overlying the upper peeling section of FIG. 2 and reproduced diagrammatically in FIG. 10. In a second step 112, the controller delays a fixed or selectable predetermined time before activating the cleaning action of the cleaning tool, such as turning on the spray by means of a signal on line 99 to the pump 100 for a spray nozzle tool, in step 114. In a next step 116, the controller advances the cleaning tool upward along the y axis to clean the insert (y=y+Δy). As the cleaning tool advances, the controller, in step 118, monitors the y coordinate of the tool by the feedback signal from the y-axis sensor 105. When the tool reaches or passes the upper end of the insert, for which y≥$Y_{max}$, the controller deactivates the cleaning action (e.g., turns off the spray) in step 120. Next, in step 122, the controller compares the x coordinate of the cleaning tool to $X_{max}$ to determine if the cleaning tool has reached or passed the upper end of the rightmost insert—the last to be cleaned in the cleaning cycle. If x≥$X_{max}$, indicating the end of the cleaning cycle, execution of the routine returns to the initial step 110 to reposition the cleaning tool at the lower end of the leftmost insert (the origin, O) for the start of the next cleaning cycle. If x<$X_{max}$, the controller, in step 124, advances the cleaning tool to the lower end of the next consecutive insert with the signals on lines 97 and 98. While the tool is advancing (x=x+Δx; y=y–Δy), the controller, in step 126, compares the x and y coordinates of the tool to the coordinates of the lower end of the next insert. When the cleaning tool reaches the start of the next insert (x≥$X_{next}$ and y=0, where $X_{next}$ is the distance from the origin to the next insert to be cleaned), the routine continues at step 114 to activate the cleaning action and advance the cleaning tool upward along the length of the insert. Thus, in this example, the controller is programmed to command the x-y robot to move the cleaning tool along a predetermined cleaning path running sequentially along the lengths of the inserts and then back to the origin, as indicated by arrows 128. But, instead of returning the cleaning tool directly back to the origin, the robot could reverse the cleaning tool's path to clean the inserts in reverse order on the way back to the origin as shown for the single cleaning tool 46 in FIG. 11A.

Figure 11B:
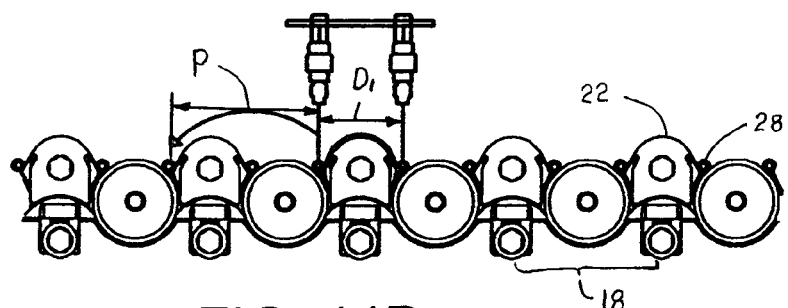
Figure 11C:
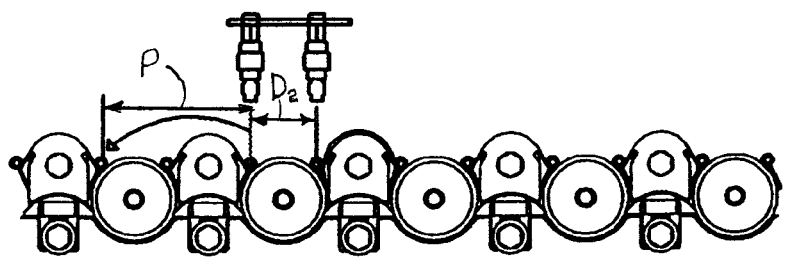
Figure 11D:
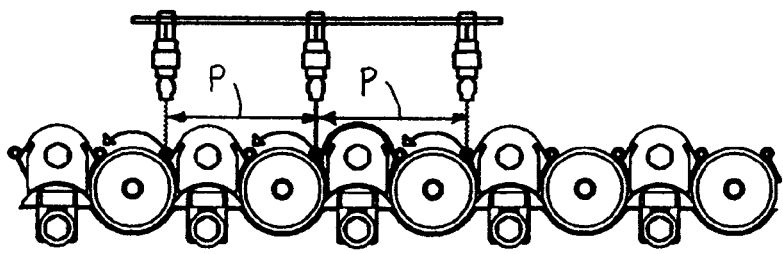

The controller can alternatively be programmed to clean the inserts 28 with two tools spaced apart a distance $D_1$ that corresponds to the distance between inserts on opposite sides of each elevated side roller 22, as shown in FIG. 11B. (The illustrations in FIGS. 11A-11D show the cleaning tool advancing from right to left, but apply as well to left-to-right advancement.) With two cleaning tools, the robot would have to make half as many passes as for the single-tool system to clean each insert once per cleaning cycle. And each translation along the x axis for the two-tool system from one insert pass to the next would be the same distance, unlike for the one-tool system, because the inserts on opposite sides of each side roller are farther apart than the inserts within each peeling channel 18. Another two-tool system is shown in FIG. 11C. It differs from the system in FIG. 11B in that the tools are spaced apart a shorter distance $D_2$ that corresponds to the distance between the inserts on opposite sides of each peeling channel. In both cases (FIG. 11B and FIG. 11C), the tools may be incremented along the x axis a distance P that corresponds to the transverse (x-axis) pitch of the peeling channels to clean each insert once per cycle. As shown in FIG. 11D, three cleaning tools may be robotically controlled to clean the peeler. In this example, the three tools are spaced apart a distance P corresponding to the transverse pitch of the peeling channels. The controller can be programmed to move the robot similar to the one-tool example given by the flowchart of FIG. 9, in which case each insert would receive three cleaning passes, one per tool, in each cycle. Clearly, there could be other arrangements and numbers of cleaning tools that could be robotically controlled by this system. The controller can also be programmed to control the speed of the cleaning tool along the inserts.

Although the invention has been described in detail with respect to a few preferred versions, other versions are possible. For example, the x- and y-axis assemblies could each have a different kind of actuator from the other. And linear actuators other than those described could be used, for example, hydraulic or pneumatic linear actuators. As another example, x- and y-position sensors other than rotary encoders could be used. Linear encoders that ride with the nuts or proximity switches at known positions along the x and y axes could be used. Furthermore, the controller could even dead reckon the position of the cleaning tool without feedback sensors. And the cleaning routine could be modified to provide different predetermined cleaning paths within the robot's working envelope over the peeling section, such as cleaning up one insert and down the next, alternately cleaning a given insert in opposite directions each consecutive cycle, making up and down cleaning passes on each insert before advancing to the next, cleaning on the return, and cleaning areas of the peeling section away from the inserts. So, as these few examples suggest, the scope of the claims is not meant to be limited to the specific details of the preferred versions.

What is claimed is:

1. Apparatus for cleaning the peeling section of a roller-type peeling machine having peeling channels formed by a plurality of parallel, overlapping rollers, comprising:
    an x-y robot disposed above a peeling section of a peeling machine and having a cleaning tool as an end effector translatable along x and y axes over a range of x and y coordinates defining a working envelope encompassing the peeling section, wherein the y axis is parallel to the lengths of the rollers and wherein the x axis is perpendicular to the y axis and parallel to the width of the peeling section;
    a controller coupled to the robot to move the cleaning tool along a predetermined cleaning path within the working envelope to clean the peeling section.

2. The apparatus of claim 1 wherein the cleaning tool is selected from the group consisting of liquid-spray nozzles, air nozzles, brushes, and scrapers.

3. The apparatus of claim 1 wherein the cleaning tool comprises a spray nozzle spraying the peeling section and the apparatus further comprises a pump controlled by the controller for selectively supplying liquid to the spray nozzle.

4. The apparatus of claim 1 wherein the controller controls the robot to advance the cleaning tool along a cleaning path that runs sequentially along the lengths of the rollers.

5. The apparatus of claim 1 wherein the x-y robot comprises x- and y-axis assemblies for controlling instantaneous x and y coordinates of the cleaning tool, the x- and y-axis assemblies selected from the group consisting of lead screws, toothed belts, and rack gears.

6. The apparatus of claim 1 wherein the x-y robot comprises:
    an x-axis assembly having a first motor and a first lead screw rotated by the first motor and defining the x axis and a first nut mounted on the first lead screw and to which the cleaning tool is connected for movement along the x axis; and a y-axis assembly having a second motor and a second lead screw rotated by the second motor and defining the y axis and a second nut mounted on the second lead screw and to which the x-axis assembly is connected for movement along the y axis.

7. A peeling machine comprising:

a frame;

a plurality of side-by-side peeling channels supported in the frame and defining a peeling section of the peeling machine, each peeling channel formed by a reciprocating bottom roller and a pair of flanking side rollers rotated by contact with the bottom roller;

a plurality of cylindrical inserts occupying spaces between the bottom and side rollers along the length of the peeling channels;

an x-y robot mounted to the frame above the peeling section and having a cleaning tool as an end effector translatable along x and y axes over a range of x and y coordinates defining a working envelope encompassing the peeling section, wherein the y axis is parallel to the length of the peeling channels and wherein the x axis is perpendicular to the y axis and parallel to the width of the peeling channels;

a controller coupled to the robot to move the cleaning tool along a predetermined cleaning path within the working envelope to clean the peeling section.

8. The peeling machine of claim 7 wherein the cleaning path runs sequentially along the lengths of the inserts.

9. The peeling machine of claim 7 wherein the cleaning tool includes a spray nozzle.

10. The peeling machine of claim 9 further comprising a pump controlled by the controller for selectively supplying liquid to the spray nozzle.

11. The peeling machine of claim 7 wherein the x-y robot includes a pair of orthogonally disposed lead screws defining the x and y axes.

* * * * *